United States Patent [19]

Rhodes

[11] 4,290,520
[45] Sep. 22, 1981

[54] CONVEYOR BELT CLEANING DEVICE
[75] Inventor: Ronald B. Rhodes, Retford, England
[73] Assignee: Salgar Supplies Ltd., England
[21] Appl. No.: 85,866
[22] Filed: Oct. 18, 1979
[30] Foreign Application Priority Data
  Oct. 20, 1978 [GB] United Kingdom ............... 41356/78
  Sep. 11, 1979 [GB] United Kingdom ............... 31434/79
[51] Int. Cl.³ ........................................... B65G 45/00
[52] U.S. Cl. ................................. 198/499; 15/256.5; 474/92
[58] Field of Search ...................... 198/497, 498, 499; 15/256.5, 256.51; 74/230; 474/92
[56] References Cited
  U.S. PATENT DOCUMENTS
  3,688,336  9/1972  Costello et al. ............... 15/256.51
  3,722,465  3/1973  Krautzberger ................ 15/256.51
  4,105,109  8/1978  Schultz ......................... 198/499

FOREIGN PATENT DOCUMENTS
  1075502  7/1967  United Kingdom ............... 198/499

Primary Examiner—Robert B. Reeves
Assistant Examiner—Douglas D. Watts
Attorney, Agent, or Firm—Thomas J. Greer, Jr.

[57] ABSTRACT

A conveyor belt cleaning device has a scraper blade element, preferably supported by a carrier, which is urged into contact with a surface to be scraped by a pressurized flexible-walled bag. The pressurization of the bag maintains the scraper blade in contact with the belt and ensures a uniform contact pressure over the entire length of the blade.

2 Claims, 4 Drawing Figures

CONVEYOR BELT CLEANING DEVICE

DESCRIPTION

This invention relates to conveyor belt cleaning devices.

A known type of conveyor belt cleaner comprises a scraper blade carried on a mounting spring by means of which the blade is maintained in contact with a surface of a conveyor belt to be cleaned. A problem associated with conveyor belt cleaners of this type is that of maintaining the scraper blade in contact with the surface to be scraped with a contact pressure which is substantially uniformly distributed over the entire length of the blade. Furthermore, the spring-mounting of the scraper blade has to be such that the blade can yield resiliently when it encounters an obstruction such as, for example, a joint region in an endless conveyor belt.

In order to provide for fine regulation of the contact pressure between a conveyor belt scraper blade and the surface being cleaned it is known to support a conveyor belt scraper blade at opposite ends on independently adjustable mounting springs. Such arrangements tend to be expensive and moreover the independent suspension springs require periodic adjustment in order to maintain a satisfactorily uniform contact pressure between the scraper blade and conveyor belt as the blade becomes worn.

An object of the present invention is to provide a conveyor belt cleaning device which avoids the need for independent suspension springs or mechanical adjustments of the mounting of a scraper blade.

According to the present invention there is provided a conveyor belt cleaning device comprising an elongate scraper element one longitudinal edge of which, in use of the device, makes scraping contact with a surface of a conveyor belt to be cleaned, the scraper element having a longitudinally extending surface portion in contact with a flexible-walled container the interior of which is pressurised, in use of the device, to maintain the scraper element in contact with the conveyor belt surface to be cleaned, a housing enclosing the flexible-walled container and having a longitudinal slot in which the said scraper element is slidable, and lateral support means secured to the housing and extending longitudinally on opposite sides of the slot to give lateral support to the scraper element externally of the housing.

By utilising the fluid pressure in the container, preferably a pneumatic pressure, to urge the scraper element into contact with the conveyor belt surface a uniform loading is applied to the scraper element along its entire length, with a yieldability which enables the scraper element to be displaced resiliently against the action of the fluid pressure in the container upon encountering an obstacle on the conveyor belt surface.

The scraper element may comprise a laminar blade releasably attached to a carrier extending longitudinally along one edge of the blade and located in the slot in the housing.

Although it is not necessary to provide a sliding seal between the scraper element and the slot, since the pressurising fluid is confined to the sealed container within the housing, such a seal may in practice be provided to prevent the ingress of dust or debris into the housing.

A shield structure may be interposed between the scraping edge of the scraper element and the housing on opposite lateral sides of the scraper element substantially to prevent the ingress of dislodged debris into the slot.

In a preferred embodiment of the invention the debris shield structure and the lateral support means are constituted by support plates secured to the housing on opposite sides of the slot therein, the plates converging towards and making contact with opposite faces of the scraper element to support the scraper element laterally, so that the support plates also serve as baffles for the deflection of debris dislodged from the conveyor belt. Alternatively the shield structure may comprise two baffle plates attached to the blade carrier of the scraper element and converging towards the conveyor belt to make contact with opposite faces of the blade of the scraper element.

The housing may be supported by at least one mounting bracket which is adjustable to permit angular adjustment of the scraper element relative to a surface to be scraped.

The flexible-walled container may comprise a sealed bag having a valve through which the bag may be pressurised with compressed air. It is a simple matter to adjust the contact pressure between the scraper element and the surface being scraped by supplying air to or releasing air from the bag through the valve.

The bag is preferably elongate and generally cylindrical in shape, the longitudinally extending surface portion of the scraper element being parallel to the longitudinal axis of the bag and comprising an elongate foot of resilient material attached to and extending longitudinally of the scraper element.

The invention will be further described, by way of example only, with reference to the accompanying purely diagrammatic drawings, in which.

In the drawings the same reference numerals are used to designate the same or corresponding component parts of the illustrated embodiments.

Figures 1, 4:
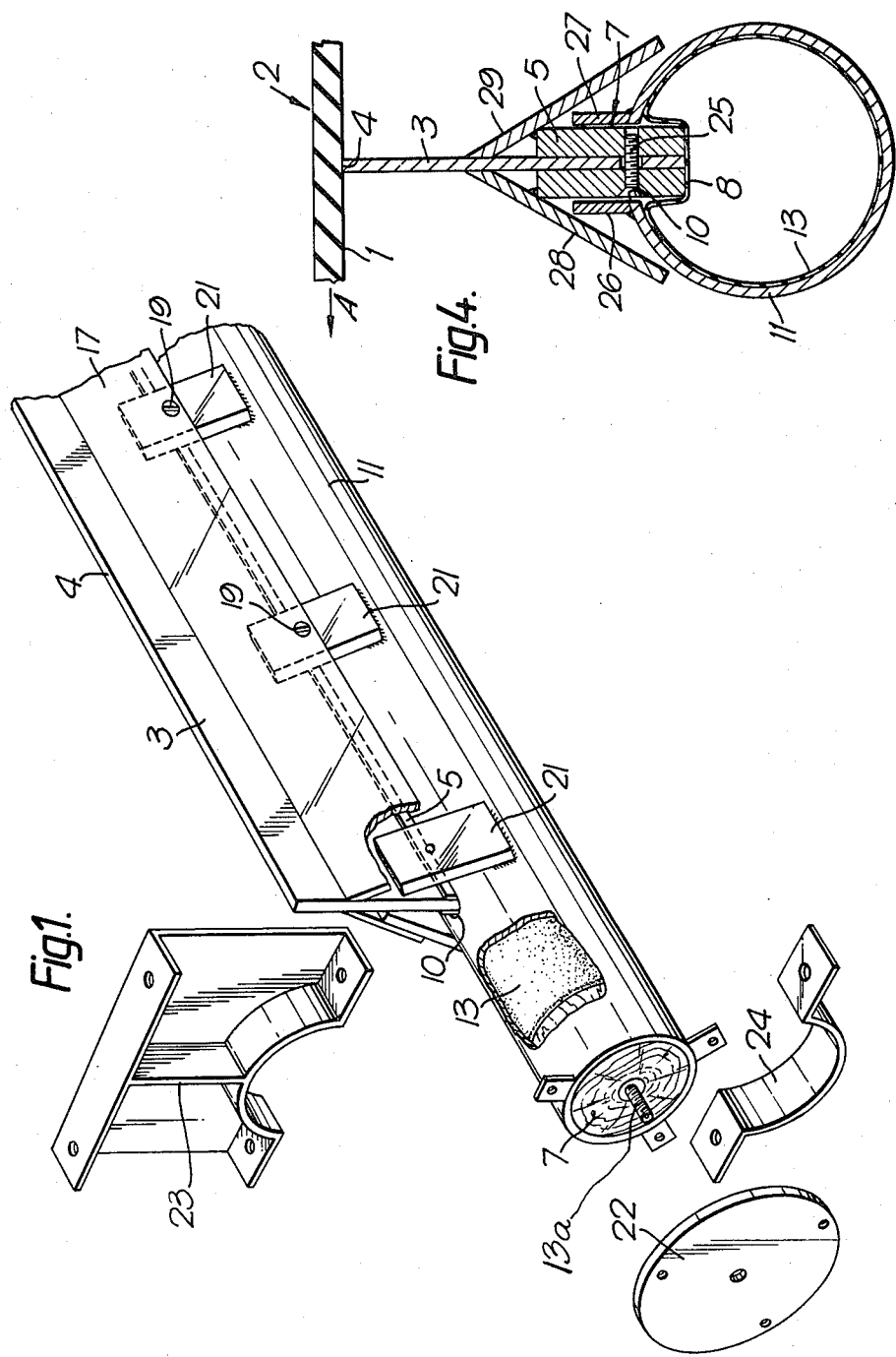
FIG. 1 is a partly cut-away perspective view of a conveyor belt cleaning device according to one embodiment of the invention.
FIG. 4 is a cross-sectional view taken on line IV—IV in FIG. 3.
Figure 2:
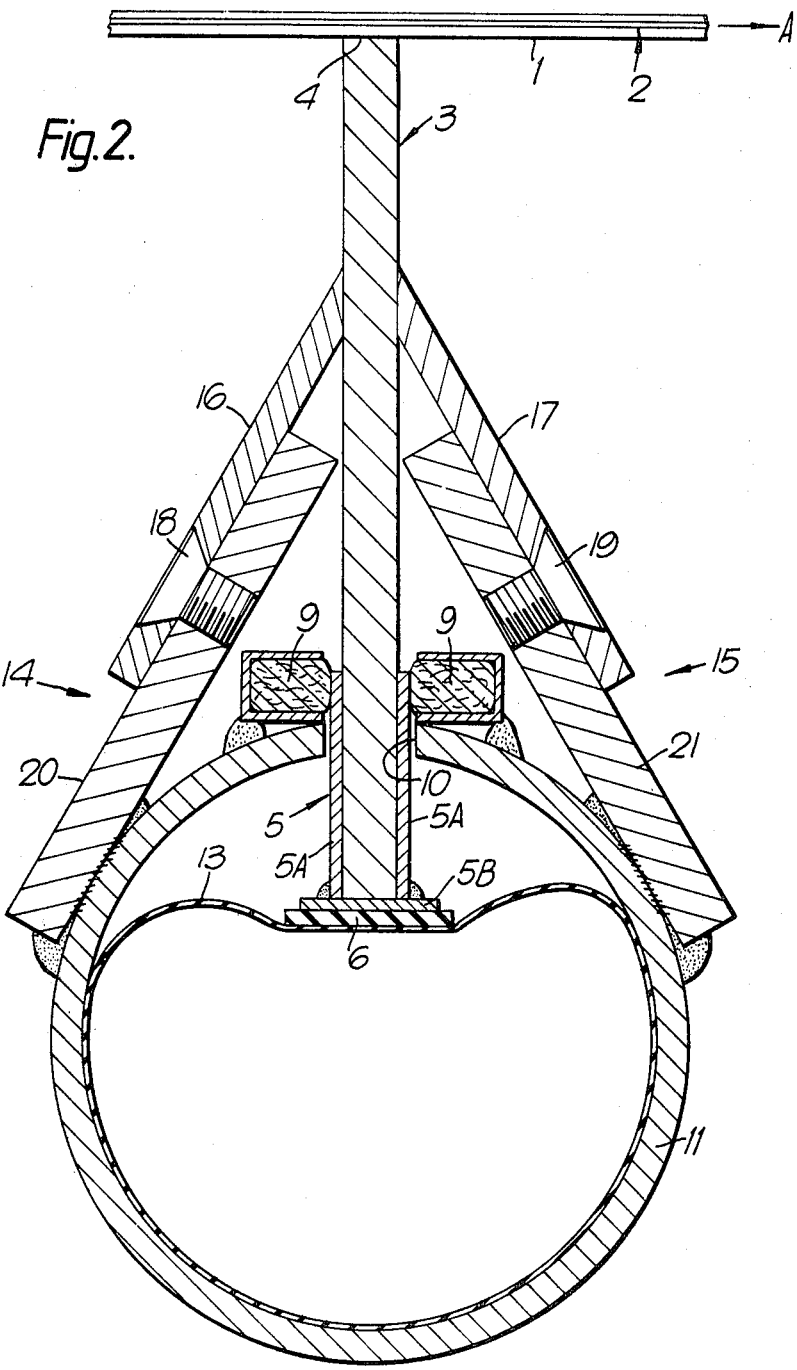
FIG. 2 is a cross-sectional view, on an enlarged scale, of the device shown in FIG. 1.

FIGS. 1 and 2 illustrate a device for cleaning a downwardly facing return surface 1 of a conveyor belt 2 which moves continuously in the direction of arrow A (FIG. 2).

The device includes a scraper element in the form of a flat scraper blade 3 having a straight scraper edge 4 which contacts the belt surface 1 to be cleaned and which may extend over the entire width of the belt 2 and project beyond the opposite longitudinal edges of the belt 2 by a short distance, typically 50 mm.

The scraper blade 3 may alternatively be somewhat shorter in length than the width of the belt 2, so that the extreme longitudinal edge portions of the belt, which in practice are often in a badly damaged, torn condition, are not in contact with the scraper blade.

The scraper blade 3 may be of rigid material such as mild steel, stainless steel, or plastics material, or may be of resiliently flexible material such as rubber or polyurethane sheet, depending upon the nature of the surface 1 to be cleaned. For some conveyor belt cleaning applications a mild steel scraper blade 3 may be employed in which the free edge portion which performs the scraping operation is selectively hardened, for example by the spraying onto this edge portion of hard metals such as nickel, chromium or beryllium.

The scraper element further includes a blade carrier 5 which is releasably attached to the longitudinal edge of the blade opposite the scraper edge 4. The blade carrier 5 comprises a shoe formed by two parallel longitudinally extending side walls 5A which engage opposite faces of the blade and which are interconnected by a base 5B which extends longitudinally of the blade and which projects laterally outwardly beyond the two side walls 5A. For a blade 3 having a width of 10 mm the blade carrier 5 would typically be fabricated in mild steel plate of 3 mm thickness, or in high molecular weight polyethylene. A rubber bearing strip 6 is bonded to the base 5B of the blade carrier 5, the bearing strip 6 extending along the entire length of the carrier, and projecting laterally beyond the outer edges of the base 5B of the carrier 5.

The blade carrier 5 is located in a rectangular slot 10 formed in a rigid tubular housing 11 of mild steel tube. The blade carrier 5 is free to slide in a radial direction with respect to the axis of the tubular housing 11, there being sufficient clearance between the outer surfaces of the carrier 5 and the walls of the slot 10 to allow unobstructed sliding movement of the carrier.

The inner end portion of the carrier 5, including the base 5B and bearing strip 6, is located in the interior of the housing 11, the bearing strip 6 making contact with a flexible-walled sealed bag 13 of generally cylindrical shape contained within the housing 11. The bag is pressurised by compressed air supplied through a valve 14 in one end of the bag, located centrally in an end wall 7 of the housing 11. The walls of the bag 13 are deformed in the vicinity of the inwardly projecting portion of the blade carrier 5, the rubber bearing strip 6 on the carrier 5 ensuring that the bag is not damaged as a result of its contact with the blade carrier 5.

The air bag 13 may typically be made of synthetic rubber or plastics or other flexible wear-resistant material.

In some installations the blade carrier 5 may be omitted, and the bag 13 may act directly upon the blade 3, in which case the edges and corners of the blade 3 within the housing 11 would be suitably rounded, or fitted with a clip-on capping of plastics material.

The blade carrier 5 is effectively trapped within the housing 11 by the base 5B, which is of greater width than the slot 10. The pressurisation of the air bag 13 results in a radially outward force being applied through the bearing strip 6 to the blade carrier 5, this force being uniform over the entire length of the carrier 5, so that the scraper blade 3 is urged radially outwardly into contact with the surface 1 of the belt 2 to be cleaned, with a contact pressure which is uniform over the entire length of the scraper blade.

The portion of the scraper blade 4 which projects externally of the housing 11 is supported laterally by two lateral supports 14, 15 attached to the tubular housing 11 and making contact with opposite faces of the scraper blade 3. Each lateral support 14, 15 comprises a support plate 16, 17 of mild steel or low density high molecular weight "non-stick" plastics, for example, polyethylene sheet which is attached by respective countersunk screws 18, 19 to support brackets 20, 21 welded to the external surface of the tubular housing 11 and spaced apart longitudinally at intervals along the housing 11 (FIG. 1). The two support plates 16, 17 converge towards and make contact with opposite faces of the scraper blade 3, giving lateral support to the blade 3 and transmitting through the support brackets 20, 21 direct to the tubular housing 11 the lateral forces, in the direction of advance A of the belt 2, which are inevitably imparted to the scraper blade 3 as a result of the scraping contact between the blade 3 and the belt 2.

As well as supporting the blade 3 laterally, the support plates 16, 17 also act as baffles for the deflection of debris dislodged from the conveyor belt in use of the device, preventing the ingress of dislodged debris into the slot 10, which would impair the free sliding of the blade carrier 5 in the slot. To further prevent the ingress of dust particles a seal is provided externally of the housing 11. The seal comprises in the illustrated embodiment a felt strip 9 soaked in oil and in contact with the opposite sides and ends of the scraper blade carrier 5 (or the scraper blade 3 itself). The sealing strip 9, which may alternatively take the form of a graphite-impregnated gland seal, is carried by a steel channel section support welded to the housing 11.

In an alternative construction, not shown, the support brackets 20, 21 or the lateral support plates 16, 17 may be replaced by rigid plates welded to the tubular housing 11 and extending over the full length of the housing 11.

The opposite end walls 7 of the tubular housing 11 are formed by respective hardwood plugs, one of which is shown in FIG. 1, the air supply valve 13a projecting from the plug and passing through a central hole in an end plate 22 which fits over the hardwood plug.

The entire housing 11 is supported from a fixed structure (not shown) by support brackets 23, one of which is shown in FIG. 1, located at opposite ends of the tubular housing 11 beyond the opposite ends of the slot 10. Each support bracket 23 incorporates a clamp 24 by means of which the tubular housing 11 may be supported adjustably, with the scraper blade 3 arranged at any desired angle to the conveyor belt surface. Adjustment of the angle of inclination of the scraper blade 3 to the surface 1 of the conveyor belt 2 may be effected by simply slackening the clamp 24, rotating the tubular housing 11 until the desired inclination of the scraper blade 3 is reached and then tightening the clamp 24 to secure the housing 11 to the fixed structure. For some practical applications the scraper blade 3 will be supported with an inclination in the direction of advance A of the conveyor belt 2 so as to minimise "chatter" or vibrations in use.

Figure 3:
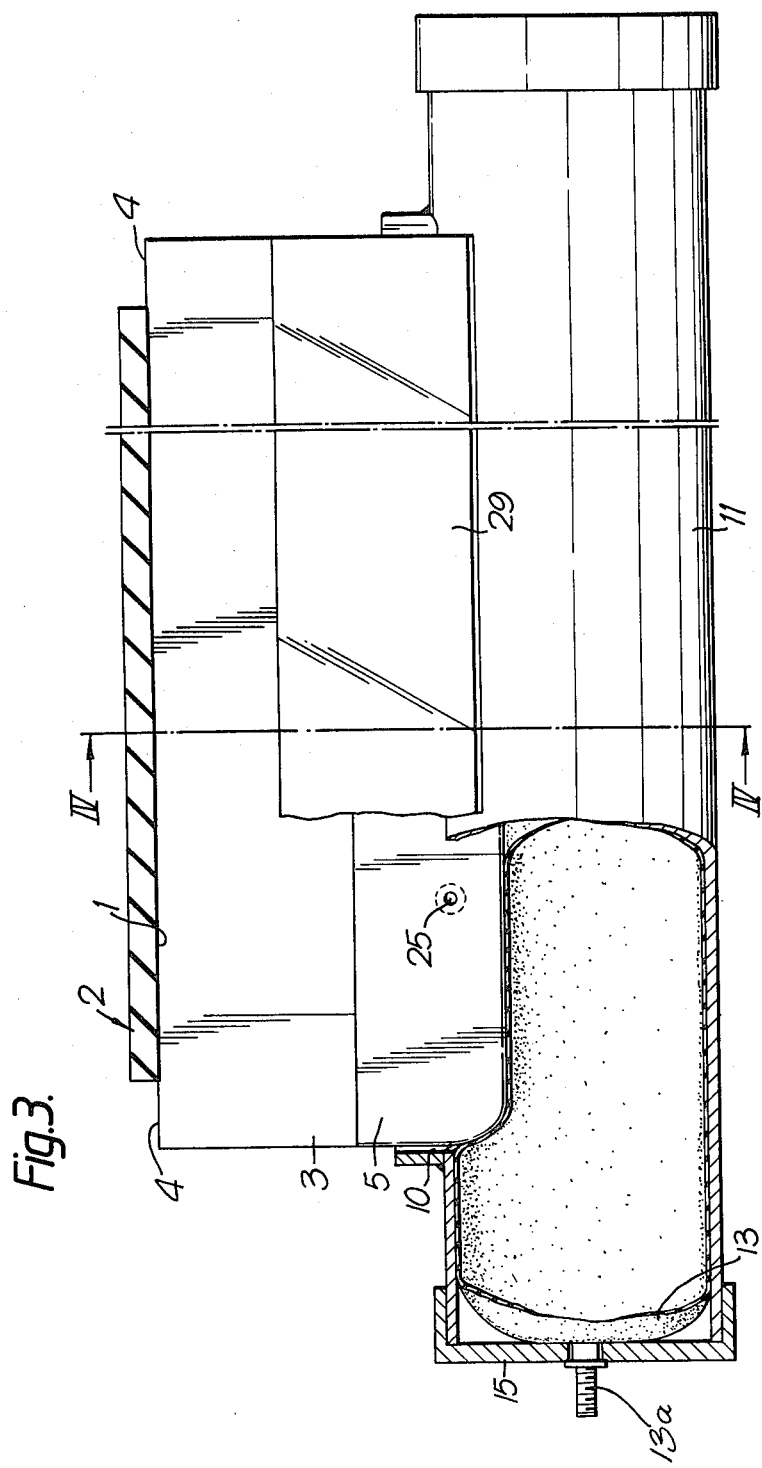
FIG. 3 is a side elevational view, partly in longitudinal section, of a conveyor belt cleaning device according to another embodiment of the invention.

FIGS. 3 and 4 illustrate an alternative embodiment of the invention, in which the scraper blade carrier 5 is releasably attached to the scraper blade 3 by means of countersunk screws 25, the blade carrier 5 being located in the slot 10 of the housing 11 and supported laterally by upstanding longitudinally extending walls 26, 27 welded to the tubular housing 11 and extending along opposite longitudinal edges of the slot 10. In this embodiment respective deflector plates 28, 29 are welded to the blade carrier 5 and are inclined to the vertical, converging towards opposite faces of the scraper blade 3. The deflector plates 28, 29 protect the underlying blade carrier 5 and the slot 10 in which it slides from debris dislodged from the conveyor belt surface 1 by the action of the scraper blade 3.

In the embodiment illustrated in FIGS. 3 and 4 the surfaces of the blade carrier 5 within the tubular housing 11 which come into contact with the flexible walled air bag 13 are rounded so as to avoid damage to the air bag. Such rounded surfaces are not necessary if the blade carrier 5 is provided with a bearing strip of suitable resilient material such as the bearing strip 6 illustrated in the embodiment of FIGS. 1 and 2. Alternatively, the blade carrier 5 in the illustrated embodiments may be formed of plastics material such as extruded high molecular weight polyethylene, in which case the blade carrier 5 may make direct contact with the air bag 13 without any interposed resilient bearing strip.

The device may be arranged so that the scraper blade 3 extends transversely across the conveyor belt 2, at right angles to the direction of advance A of the belt. Alternatively, the device may be used for scraping an upward-facing surface of a conveyor belt, in which case the device may be mounted so that the scraper blade 3 is inclined at an angle to the direction of advance A of the belt: such an arrangement has the effect of scraping material from the surface of the conveyor belt 1, at the same time deflecting the dislodged material to one side of the belt.

As the contact surface of the scraper blade 3 wears in use, the surface area of contact between the scraper blade 3 and the conveyor belt surface 1 will in general increase. In order to maintain a uniform contact pressure between the scraper blade 3 and the conveyor belt surface 1, such wear may be compensated by increasing the internal pressure in the flexible-walled bag 13. A pressure gauge (not shown) may be connected to the bag 13, or to the valve 13a, to enable the pressure in the bag to be monitored. Such a pressure gauge may be calibrated so as to provide a direct reading of the contact pressure between the scraper blade 3 and the surface 1 being cleaned.

It will be appreciated that the scraper device of the present invention enables the contact pressure between the scraper blade and the surface being scraped to be adjusted to an optimum value, selected according to the nature of the surface being scraped, the rate of wear of the scraper blade and the efficiency of the cleaning operation. In practice a minimum pressure in the flexible-walled container would be employed consistent with obtaining effective cleaning of a surface being scraped, and while allowing a small excess pressure to compensate for the pressure drop which inevitably occurs as the blade wears in use. The optimum pressure to be applied to the blade can easily be established by field trials.

I claim:

1. A conveyor belt cleaning device comprising:
   (a) an elongate scraper element having a longitudinal scraping edge which makes scraping contact with a surface of a conveyor belt to be cleaned, the scraper element having a longitudinally extending inner surface portion opposite to said longitudinal edge;
   (b) a flexible-walled container the interior of which is pressurized for maintaining the said inner surface portion of the scraper in contact with the container and thereby maintaining the scraper element in contact with a conveyor belt surface to be cleaned;
   (c) a housing enclosing the flexible-walled container and having a slot in which said scraper element is slidable;
   (d) a debris shield structure interposed between the scraping edge of the scraper element and the housing and disposed on opposite lateral sides of the scraper element to prevent the ingress of dislodged debris from a conveyor belt being cleaned into the housing slot, said debris shield structure comprising support plates secured to the housing on opposite sides of the slot therein, the plates converging towards and making contact with opposite faces of the scraper element to support the scraper element laterally, externally of the housing, said support plates serving to deflect debris dislodged from the conveyor belt;
   (e) the said surface portion of the scraper element in contact with the flexible-walled container having rounded edges and/or corners.

2. A conveyor belt cleaning device comprising:
   (a) an elongate scraper element having a longitudinal scraping edge which makes scraping contact with a surface of a conveyor belt to be cleaned, the scraper element having a longitudinally extending inner surface portion opposite to said longitudinal edge;
   (b) a flexible-walled container the interior of which is pressurized for maintaining the said inner surface portion of the scraper in contact with the container and thereby maintaining the scraper element in contact with a conveyor belt surface to be cleaned;
   (c) a housing enclosing the flexible-walled container and having a slot in which said scraper element is slidable;
   (d) a debris shield structure interposed between the scraping edge of the scraper element and the housing and disposed on opposite lateral sides of the scraper element to prevent the ingress of dislodged debris from a conveyor belt being cleaned into the housing slot, said debris shield structure comprising support plates secured to the housing on opposite sides of the slot therein, the plates converging towards and making contact with opposite faces of the scraper element to support the scraper element laterally, externally of the housing, said support plates serving to deflect debris dislodged from the conveyor belt;
   (e) the flexible-walled container being elongate and generally cylindrical in shape, the scraper element having an elongate foot of resilient material attached to and extending longitudinally of the scraper element, said foot being provided with the longitudinally extending inner surface portion.

* * * * *